United States Patent [19]

Spencer

[11] Patent Number: 4,643,228

[45] Date of Patent: Feb. 17, 1987

[54] CONVERTIBLE HIGH OR LOW PRESSURE PILOT VALVE

[75] Inventor: Larry K. Spencer, Carrollton, Tex.

[73] Assignee: Sigma Enterprises, Inc., Dallas, Tex.

[21] Appl. No.: 585,823

[22] Filed: Mar. 2, 1984

[51] Int. Cl.[4] .......................................... F15B 13/042
[52] U.S. Cl. ............................. 137/625.66; 137/269;
 137/625.68
[58] Field of Search .............. 137/269, 625.66, 625.68;
 251/DIG. 1, 900

[56] References Cited

U.S. PATENT DOCUMENTS

| | | | |
|---|---|---|---|
| 323,404 | 8/1885 | Durfee ............................ | 137/625.68 |
| 1,431,101 | 10/1922 | Dineen ........................... | 137/625.68 |
| 2,910,050 | 10/1959 | Dotter et al. ................... | 137/625.66 |
| 3,429,341 | 2/1969 | Sochting ......................... | 137/625.68 |
| 3,621,881 | 11/1971 | Vicari ............................. | 137/625.66 |
| 4,209,040 | 6/1980 | Peters ......................... | 137/625.68 X |
| 4,252,145 | 2/1981 | Peters ......................... | 137/625.66 X |

Primary Examiner—Gerald A. Michalsky
Attorney, Agent, or Firm—Crutsinger & Booth

[57] ABSTRACT

A convertible high or low pressure pilot valve adapted to selectively control fluid flow between a common port and a supply port or exhaust port by moving a band of orifices in a plunger that is slidably disposed within the valve past an O-ring seal disposed between the supply port and the exhaust port so as to establish fluid communication between the common port and the supply port whenever the band is aligned with the supply port through a unitary axial bore in the plunger that maintains fluid communication with the common port or between the common port and the exhaust port through the same axial bore, whenever the band is aligned with the exhaust port or to block fluid communication between the common port, the supply port, and the exhaust port whenever the band is disposed between the supply port and the exhaust port in such manner that the O-ring bridges the orifices in such band.

17 Claims, 3 Drawing Figures

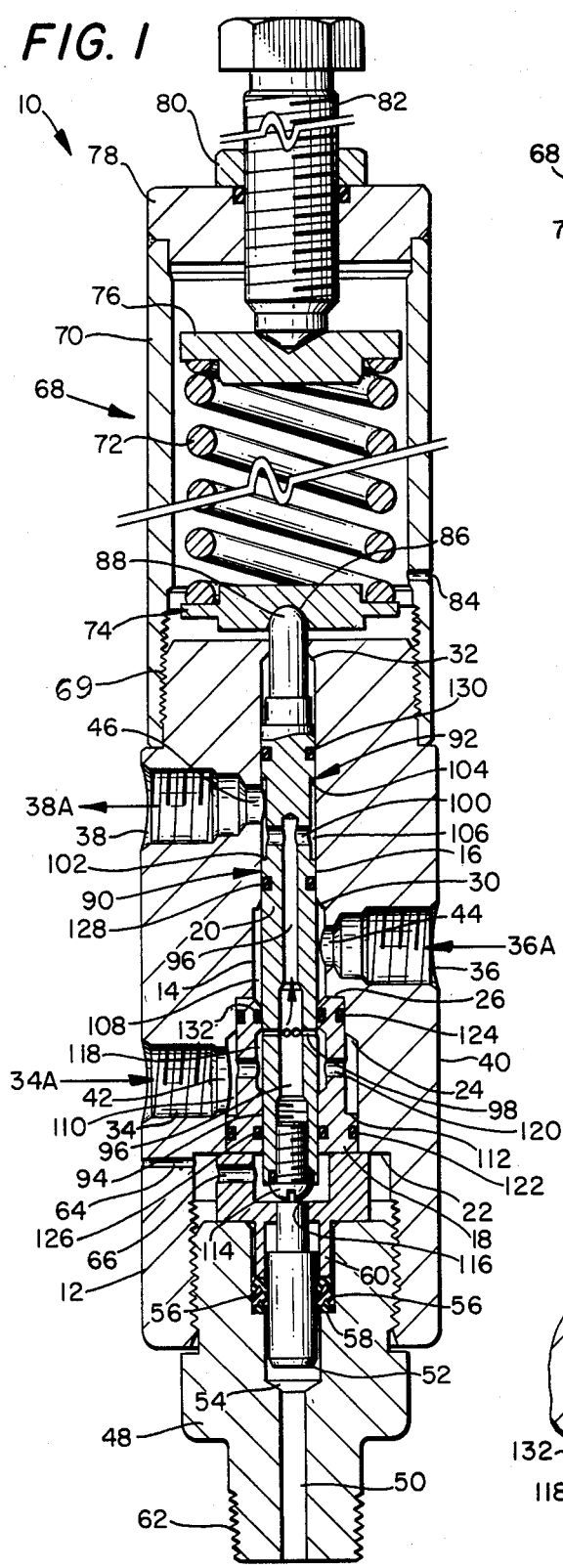
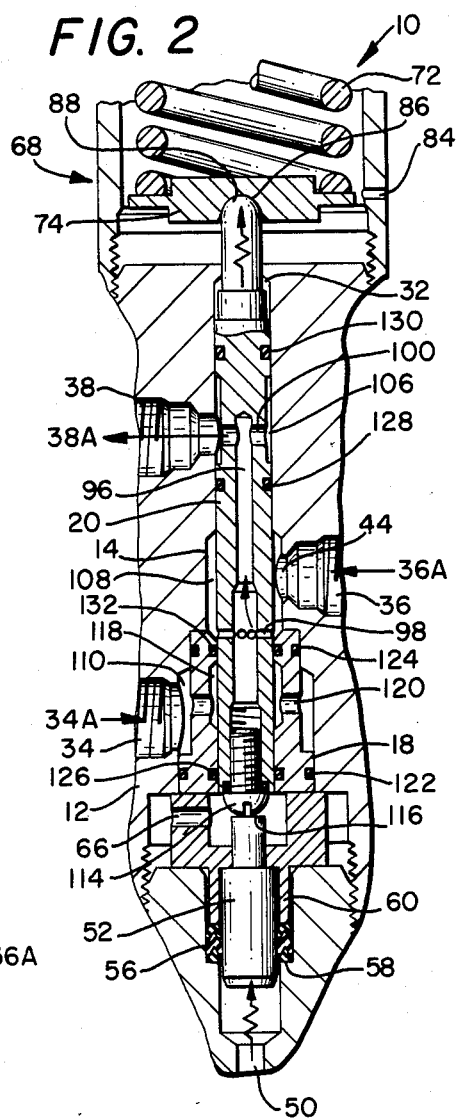
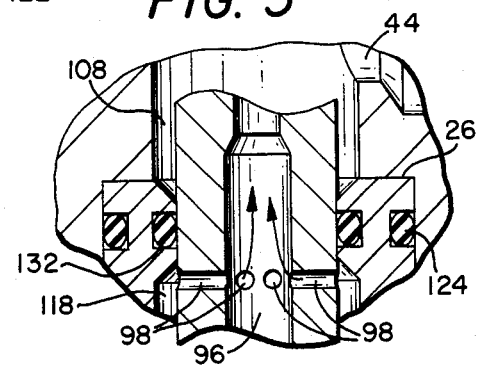

CONVERTIBLE HIGH OR LOW PRESSURE PILOT VALVE

TECHNICAL FIELD

This invention relates to pilot valves used for controlling the flow of pressurized fluids. One aspect of the invention relates to pilot valves adapted to sense rising or falling line pressure and to provide the desired response when that pressure either exceeds or falls below a predetermined level. A further aspect of the invention relates to a convertible high or low pressure pilot valve that has improved flow capabilities, is more easily manufactured, and is more resistant to wear. Still another aspect of the invention relates to a pressure sensing pilot valve that has the flow capabilities to also function as a bleed-only valve if desired.

BACKGROUND ART

The use of pilot valves for sensing flow line pressure variations and for controlling the flow of a pressurized fluid in response to those variations is well known. Pilot valves typically comprise a cylindrical body having a centrally disposed longitudinal bore. One end of the valve contains a pressure sensor that is acted upon by the pressurized fluid in the flow line on which the pilot valve is installed. The other end of the valve is closed and contains a spring adapted to exert a force in opposition to that exerted on the pressure sensor by the pressurized fluid. A plunger inside the valve slides back and forth within the bore in response to variations in flow line pressure. The position of the plunger within the longitudinal bore at a given time is determined by the magnitude of the flow line pressure relative to the pressure exerted by the spring.

The body of a typical convertible high or low pressure pilot valve also contains three longitudinally spaced, radially directed ports that communicate with the valve bore. These ports are commonly referred to as the supply port, exhaust port and common port. The particular port that is employed as either the supply port or the exhaust port will depend on whether the valve is installed as a high or low pressure pilot. The plunger is adapted to selectively permit fluid communication between the common port and the supply or exhaust port as it moves back and forth within the bore in response to variations in flow line pressure. O-ring seals are typically employed between adjacent ports to restrict fluid flow in the annular space between the plunger and the longitudinal bore.

Convertible high or low pressure pilot valves are usually installed in series in a control loop that also contains a relay valve. When either the high or low pressure sensing pilot valve trips, the relay valve loses pressure and actuates a surface safety valve, shutting-in the flow line.

Pilot valves employing conventional designs are disclosed in the following U.S. Pat. Nos. 3,043,331; 3,621,881; 3,746,047; 3,888,457; 4,084,613; 4,209,040; and 4,217,934. In some cases, fluid communication between selected ports is achieved by varying the diameter of the plunger, thereby creating spool-shaped segments of sufficient length to provide communication between adjacent ports whenever the plunger is appropriately positioned. In other cases, the plunger is adapted by means of interior passageways to provide fluid communication between ports as desired whenever the plunger is in the appropriate position. Although many different models of pressure sensing pilot valves are commercially available, certain problems and difficulties have been experienced in the manufacture and use of these valves that have impaired their desirability, usefulness and reliability, and have highlighted the need for the innovative improvements disclosed herein.

One problem experienced with conventional pressure sensing pilot valves relates to the O-ring seals that are employed between adjacent ports to restrict fluid flow in the annular space between the longitudinal bore and the plunger. These seals are typically made of rubber, and are much more subject to wear and degradation than other parts of the valve. This is particularly true where the valve is designed and constructed in such manner that the seals are seated on the slide or plunger and are required to pass over ports or orifices in the valve body during use. Problems are especially apparent where the ports or orifices are relatively large compared to the size of the O-rings and where the edges of the ports or orifices are sharp or rough.

Problems have also arisen with pilot valves in which the O-rings are subjected to large pressure differentials as they are moved past parts or orifices. In such cases the O-rings are extruded into the open spaces, resulting in undesirable bypass or leakage.

A convertible high or low pressure pilot valve is therefore needed in which the O-ring seals are not required to pass over large diameter ports or orifices and are not subjected to undesirable pressure differentials when moving from one flow configuration to another.

SUMMARY OF THE INVENTION

According to the present invention, a convertible high or low pressure pilot valve is provided that employs a hollow plunger to move a narrow band of ports past a captured O-ring seal to provide a block and bleed action for the pilot control pressure in response to variations in sensed line pressure. The hollow plunger facilitates careful control of the entrance angle of the plunger ports during manufacture, thereby extending the life of the O-ring seal by preventing the plunger port from biting into the O-ring.

The pilot valve of the present invention utilizes a hollow plunger in combination with multiple, circumferentially-spaced plunger inlet ports of relatively small diameter to increase the flow capability through the plunger without adversely affecting O-ring wear. The greater flow areas through the plunger permit the valve to be used effectively in a bleed-only pilot system, unlike the prior art valves. Furthermore, when the present valves are mounted in series and used in a block and bleed mode, the greater flow capabilities enhance the actuation times of associated automation equipment such as the surface safety valves on oil wells.

The valve disclosed herein alters the porting sequence employed in conventional valves in that the common port is not disposed between the supply and exhaust ports, thereby permitting fluid flow through the valve to be selectively controlled without subjecting any O-ring to undesirable pressure differentials and without requiring movement of any O-ring past a port or orifice having a diameter larger than the cross-sectional diameter of such O-ring.

The new valve permits the use of manufacturing methods which avoid problems previously encountered in aligning the ports on the valve plunger and deburring problems previously experienced with valves comprising multiple port passages.

BRIEF DESCRIPTION OF THE DRAWINGS

The invention is further described and understood in relation to the following drawings wherein:

FIG. 1 depicts an elevation view, partially in section, of the convertible high or low pressure pilot valve of the invention;

FIG. 2 is a fragmentary sectional elevation view of the valve shown in FIG. 1 wherein the pressure sensor and plunger are disposed in an alternate position; and FIG. 3 is a fragmentary detail view depicting the zone between the supply and exhaust ports of the subject pilot valve wherein the plunger is in the same position as that shown in FIG. 1.

DETAILED DESCRIPTION OF THE PREFERRED EMBODIMENT

Referring to FIG. 1, convertible high or low pressure pilot valve 10 preferably comprises a cylindrical body 12 having a centrally disposed longitudinal bore 14 defined by interior wall 16. The diameter of longitudinal bore 14 is graduated so as to accommodate the insertion of spool 18 and plunger 20 therein during assembly of pilot valve 10. The graduations and the diameter of longitudinal bore 14 are further defined by shoulders 22, 24, 26, 30 and 32.

Cylindrical body 12 further comprises a plurality of longitudinally spaced ports 34, 36, 38 that are directed radially inward to provide fluid communication between exterior wall 40 and longitudinal bore 14. Each of body ports 34, 36, 38 is preferably threaded on the interior surface thereof to facilitate coupling with an appropriate external line. As shown in FIG. 1, port 34 is the supply port, port 36 is the exhaust port and port 38 is the common port whenever pilot valve 10 is installed as a high pressure pilot. Port 34 is the exhaust port, port 36 is the supply port and port 38 is again the common port whenever pilot valve 10 is installed as a low pressure pilot. This porting sequence is unlike that of conventional pressure sensing pilot valves, which typically positions the common port between the two supply ports. The interior ends of ports 34, 36, 38 terminate in orifices 42, 44, 46, respectively, through interior wall 16 of longitudinal bore 14.

Pilot valve 10 comprises body end portion 48 that is adapted to threadedly engage cylindrical body 12, and further comprises a centrally disposed longitudinal bore 50 that is coaxially aligned with longitudinal bore 14 of cylindrical body 12. Longitudinal bore 50 of body end portion 48 is adapted to provide fluid communication between pressure sensor 52 and the flow line on which pilot valve 10 is installed. The diameter of longitudinal bore 50 is also graduated, and shoulder 54 maintains pressure sensor 52 within body end portion 48 when flow line pressure is relieved.

Packing material 56 is provided in the annulus around pressure sensor 52 to prevent leakage or bypass of the pressurized fluid around pressure sensor 52. Packing material 56 is maintained in place by shoulder 58 of body end portion 48 and by packing backup block 60. Packing backup block 60 contains spool 18 within body 12 in the event that pilot valve 10 overpressures. For sensors 52 having a diameter larger than about one inch, packing material 56 can be incorporated into an annular groove in the outside wall of pressure sensor 52. Body end portion 48 is preferably provided with external threads 62 to facilitate coupling to the pressurized flow line. Vent passageways 64, 66 are provided in cylindrical body 12 and packing backup block 60, respectively.

Convertible pilot valve 10 preferably further comprises spring assembly 68, which is adapted by means of internal threads 69 to threadedly engage the end of cylindrical body 12 that is opposite body end portion 48. According to the embodiment shown in FIG. 1, spring assembly 68 comprises spring housing 70, compression spring 72, forward spring guide 74, rear spring guide 76, end cover 78, lock nut 80 and adjustment nut 82. Spring housing 70 further comprises vent passage 84. Forward spring guide 74 is preferably adapted by means of recess 86 to engage and seat end portion 88 of plunger 20. End portion 88 is preferably hemispherical and cooperates with recess 86 to center spring 72 within spring housing 70 and to compensate for misalignment that might otherwise be caused by spring discontinuities. Lock nut 80 and adjustment nut 82 are provided to adjust the force that is applied to end portion 88 of plunger 20 through forward spring guide 74.

Plunger 20 preferably comprises a substantially cylindrical rod having a primary outside diameter that is slightly smaller than the diameter of longitudinal bore 14 at points 90, 92 and the diameter of bore 94 of spool 18. Plunger 20 further comprises a centrally disposed, longitudinal bore 96 that provides a passageway for fluid communication between radially directed plunger ports 98 and radially directed plunger ports 100. Shoulders 102, 104 define the longitudinal limits of a circumferentially extending recess in the surface of plunger 20 which creates an annulus 106 for providing fluid communication between plunger ports 100 and orifice 46 of common port 38. Another annulus 108 is created adjacent orifice 44 of port 36 by the differential diameters of longitudinal bore 14 and plunger 20 within the longitudinal limits defined by shoulder 30 and that portion of the bottom face of spool 18 that extends radially inward from shoulder 26.

Annulus 110 is disposed adjacent orifice 42 of port 34 and is created by the differential between the outside diameter of spool 18 and longitudinal bore 14 between the longitudinal limits defined by shoulder 112 of spool 18 and shoulder 24 of cylindrical body 12. Annulus 118 defined by plunger 20 and a recess in the interior wall of spool 18 communicates with annulus 110 through radial passageways 120. Screw 114 engages internal threads in plunger 20. The head of screw 114 provides facing contact with lower face 116 of pressure sensor 52 and an O-ring disposed under the screw head prevents fluid leakage around the screw.

The structure and operation of pilot valve 10 is further described and explained in relation to FIGS. 1 through 3. FIG. 3 is an enlarged fragmentary view of a portion of FIG. 1 wherein plunger 20 is in the same position relative to the remainder of pilot valve 10. FIG. 3 enlarges the area of FIG. 1 surrounding plunger ports 98 and better illustrates the placement of plunger ports 98 relative to O-ring 132 and to annular spaces 108 and 118. FIG. 2 is a fragmentary view of that portion of pilot valve 10 that surrounds pressure sensor 52 and plunger 20. The portion of pilot valve 10 shown in FIG. 2 differs from FIG. 1 only in the position of pressure sensor 52 and plunger 20 relative to the remainder of the valve. In FIGS. 1 and 3, if pilot valve 10 is installed in a high pressure application, then it is shown in the "in service" position. Conversely, if pilot valve 10 is installed in a low pressure application, then it is shown in the "tripped" position. The fluid flow through pilot valve 10 in both high and low pressure applications is described in greater detail below.

As shown in FIGS. 1 and 3, the line pressure being exerted through longitudinal bore 50 against pressure sensor 52 is less than the force exerted by spring 72 against plunger 20. Thus, plunger 20 is moved sufficiently toward body end portion 48 that plunger ports 98 are adjacent annular space 118 in spool 18, permitting fluid communication between annular space 118 and longitudinal bore 96 of plunger 20. When plunger 20 is in the position shown in FIGS. 1 and 3 and pilot valve 10 is installed as a high pressure pilot, fluid continuity is established by flowing inwardly through port 34 around annular space 110 in longitudinal bore 14, through radial passageways 120 in spool 18, around annular space 118, through plunger ports 98 and longitudinal bore 96 of plunger 20, through plunger ports 100, around annular space 106, and through orifice 46 and common port 38. When plunger 20 is in the position shown in FIGS. 1 and 3 and pilot valve 10 is installed as a low pressure pilot, the valve is "tripped" and the fluid flow is reversed, entering body 12 through common port 38 and being exhausted through port 34.

In FIG. 2, the flow line pressure is sufficiently greater than the force being exerted by spring 72 that plunger 20 is moved toward spring assembly 68, thereby establishing fluid communication between annulus 106 and annulus 108 through plunger ports 100 and longitudinal bore 96 of plunger 20.

When plunger 20 is in the position shown in FIG. 2 and pilot valve 10 is installed as a low pressure pilot, then the valve is in the "in service" position. Conversely, if pilot valve 10 is installed in a high pressure application, then it is shown in the "tripped" position.

When plunger 20 is in the position shown in FIG. 2 and pilot valve 10 is installed as a low pressure pilot, fluid continuity is established by flowing inwardly through port 36, around annulus 108, through plunger ports 98, along longitudinal bore 96 of plunger 20, through plunger ports 100, around annulus 106 and through orifice 46 and common port 38. When plunger 20 is in the position shown in FIG. 2 and pilot valve 10 is installed as a high pressure pilot, the fluid flow is reversed, with the fluid being exhausted through port 36.

Although six plunger ports 98 and two plunger ports 100 are depicted in FIGS. 1 through 3 for clarity of illustration, it is understood that the number of circumferentially spaced plunger ports can vary, depending for example upon port diameters, spacing and manufacturing considerations. In each instance, however, it is important to the present invention that the total flow area through plunger ports 98, plunger ports 100 and longitudinal bore 96 be large enough to permit the control fluid to be exhausted within the desired response time whenever pilot valve 10 is tripped. Also, it is important that the diameter of plunger ports 98 be small relative to the cross-sectional diameter of O-ring 132 to minimize O-ring wear as plunger ports 98 move back and forth across that O-ring. Minimizing the diameter of plunger ports 100 is not critical since no O-ring passes those ports. Thus, the combined flow area through the two plunger ports 100 will approximately equal the combined flow area through the six plunger ports 98, and vice versa, to avoid overly restricting fluid flow through pilot valve 10.

The valve design disclosed herein is simple but effective. The placement of ports and O-rings is such that excellent performance is achieved with minimal O-ring wear. Because spool 18 maintains a fixed position relative to cylindrical body 12, O-rings 122, 124 do not incur any wear due to translational motion between the two. O-ring 126 provides a fluid seal between plunger 20 and longitudinal bore 94 of spool 18, and is thereby subjected to translational motion between plunger 20 and spool 18, but is never required to traverse a port or orifice. O-rings 128, 130 are captured in circumferentially extending grooves around plunger 20. The spacing between O-ring 128 and ports 36, 38 and between O-ring 130 and port 38 is preferably such that neither of those O-rings is required to traverse any part of a port or orifice as plunger 20 moves back and forth within longitudinal bore 14 during operation of pilot valve 10. O-ring 130 must be moved past port 38 during assembly of the valve, but is thereafter only subjected to translational motion against interior wall 16 of longitudinal bore 14, and is not required to traverse any port or orifice. Port 38 can be easily deburred during manufacture. Thus, O-ring 132 in spool 18 is the only fluid seal that has to traverse a port or orifice during operation of the valve. Because of the manner in which pilot valve 10 is designed, the entrance angle of plunger ports 98 can be machined and deburred so as to minimize wear or damage to O-ring 132.

The many advantages of the convertible pilot valve disclosed herein represent a significant and unexpected advancement in overcoming problems that have previously been encountered with conventional valves. Other alterations, modifications and advantages of the invention will also become apparent to those of ordinary skill in the art upon reviewing the specification and drawings. Thus, for example, it is possible to alter the porting sequence within the scope of the invention by locating port 38 between port 34 and body end portion 48 and by turning the plunger around to permit the same flow configuration. It is intended that the invention be limited only by the scope of the appended claims.

What is claimed is:

1. A valve comprising:
   a body;
   a bore extending longitudinally through said body;
   a plunger means slidably disposed within said bore;
   an annulus extending longitudinally through said bore between said body and said plunger means;
   pressure sensor means disposed at the proximal end of said body in contacting relation with the proximal end of said plunger means;
   spring assembly means disposed at the distal end of said body in contacting relation with the distal end of said plunger means;
   a plurality of longitudinally spaced, radially extending ports providing fluid communication with said bore through said body, said ports further comprising at least one control fluid supply port, at least one control fluid exhaust port and at least one control fluid common port, said ports being sequentially positioned so that said control fluid common port is not disposed between said control fluid supply port and said control fluid exhaust port;
   a graduated diameter longitudinal passageway disposed within said plunger means;
   first and second longitudinally spaced arrays of circumferentially spaced, radially directed passageways providing fluid communication with said longitudinal passageway through said plunger means, said first array being disposed adjacent said control fluid common port and said second array being disposed adjacent to said control fluid supply port when said plunger means is in a first position and adjacent said control fluid exhaust port when said plunger means is in a second position; and sealing means disposed between said ports and adapted to prevent fluid communication between said ports through said annulus;

said graduated diameter longitudinal passageway being of greater diameter adjacent the second array than adjacent the first array, and the radially directed passageways in the second array being greater in number and individually smaller in diameter than the radially directed passageways in the first array.

2. The valve of claim 1 wherein the sealing means further comprises an O-ring adapted to prevent fluid communication through the annulus between the control fluid supply port and the control fluid exhaust port.

3. The valve of claim 2 wherein said O-ring is disposed in an annular groove in a spool that is coaxially disposed within said bore around said plunger means.

4. The valve of claim 2 wherein said O-ring has a cross-sectional diameter that is greater than the diameter of the radially directed passageways providing fluid communication with the longitudinal passageway of said plunger means at the end opposite the control fluid common port.

5. The valve of claim 1 wherein the longitudinal bore through the body has a graduated diameter.

6. The valve of claim 1 wherein enlarged annular spaces are provided adjacent to each port to promote fluid communication between such port and the radially directed passageways in the plunger means.

7. The valve of claim 1 wherein only one sealing means is traversed by the second array as the plunger means moves slidably between the position where the control fluid common port communicates with the control fluid supply port and the position where the control fluid common port communicates with the control fluid exhaust port.

8. A pilot valve for controlling the flow of fluid in a control system in response to pressure variations in a flow line, said valve comprising: a body having an axial bore formed therein, said body having a plurality of body ports including a supply port, and exhaust port and a common port communicating with said bore, said body ports being axially spaced, said supply port and said exhaust port communicating with said bore at positions between said common port and an end of said bore; plunger means movably disposed in said bore, said plunger means having an axially extending passageway and first and second bands of radially directed plunger ports communicating with said passageway, said plunger means being positioned in said bore to form an annulus; pressure sensing means at one end of said body, said pressure sensing means being adapted to impart translational motion to the plunger means in response to variations in flow line pressure, said sensing means being adapted to move said plunger between first and second positions, one of said bands of radially directed plunger ports communicating with said supply port when said plunger is in said first position, said band communicating with said exhaust port when said plunger is in said second position; and seal means secured to said body and urged into sealing engagement with said plunger means, said seal means having a dimension measured longitudinally of said bore which is greater than the maximum dimension measured longitudinally of said bore of each of said plunger ports.

9. The pilot valve of claim 8 wherein said sealing means further comprises an O-ring adapted to prevent fluid communication through the annulus between the supply port and the exhaust port.

10. The pilot valve of claim 9 wherein said O-ring is disposed in an annular groove in a spool that is coaxially disposed within said axial bore around said plunger means.

11. The pilot valve of claim 9 wherein said O-ring has a cross-sectional diameter that is greater than than the diameter of the radially directed plunger ports providing fluid communication with the axial passageway of said plunger means at the end opposite the common port.

12. The pilot valve of claim 8 wherein said axial bore through the body has a graduated diameter.

13. The pilot valve of claim 8 wherein enlarged annular spaces are provided adjacent to each body port to promote fluid communication between such body port and the radially directed plunger ports.

14. The pilot valve of claim 8 wherein the axial passageway through said plunger means has a graduated diameter.

15. The pilot valve of claim 8 wherein only one sealing means is traversed by a band of plunger ports during translational movement of the plunger means between the position where the common port is in fluid communication with the supply port and the position where the common port is in fluid communication with the exhaust port.

16. The pilot valve of claim 8 wherein the band of plunger ports away from the common port comprises a greater number of ports than the band of plunger ports nearest the common port.

17. The pilot valve of claim 8 wherein the plunger ports in the band that is disposed at the end opposite the common port have a diameter that is less than the diameter of the plunger ports in the band that communicates with the common port.

* * * * *